Feb. 21, 1928.
C. DIANTONEO
1,659,593
HANDLE GUARD
Filed June 7, 1927
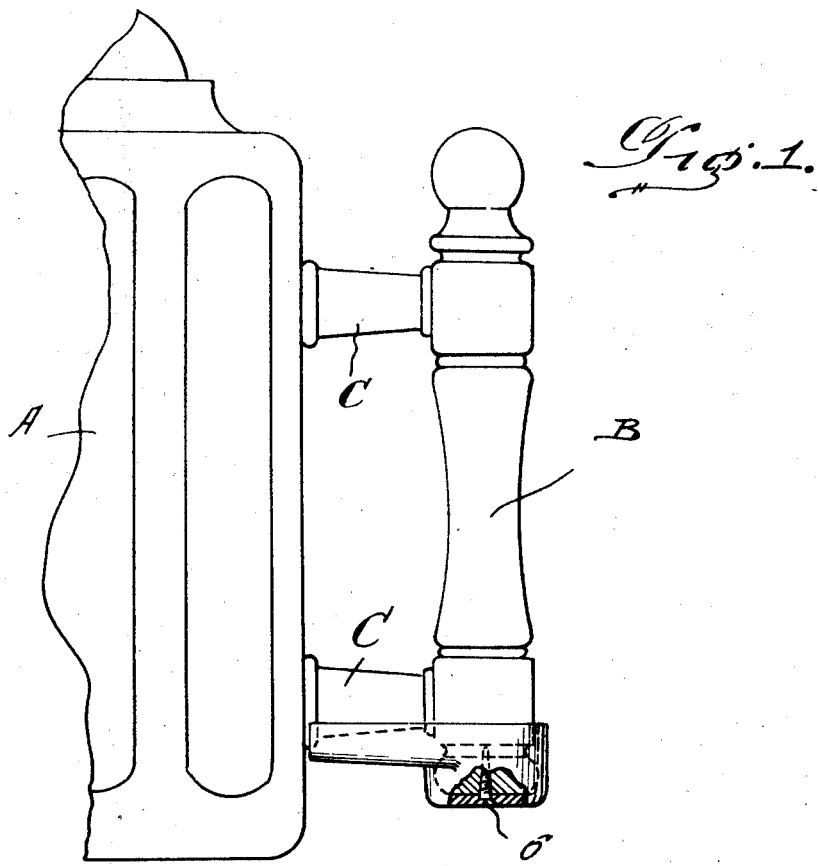
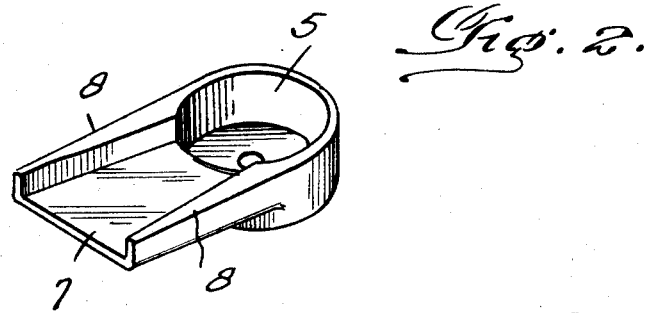
Inventor
Carmen Diantoneo,
By Clarence A. O'Brien
Attorney Patented Feb. 21, 1928.

1,659,593

UNITED STATES PATENT OFFICE.

CARMEN DIANTONEO, OF TRENTON, NEW JERSEY.

HANDLE GUARD.

Application filed June 7, 1927. Serial No. 197,092.

This invention relates generally to coffee pots, percolators, and the like, and has more particular reference to a guard for the handle thereof, the invention aiming to provide a member constructed for permanent attachment to the lower end of the handle so as to protect the same from the gas burner or stove flame, which in the absence of the present guard quickly deteriorates the handle, necessitating the discarding of the entire pot or percolator.

In carrying out the present invention there is provided an inexpensive guard that may be readily attached to conventional designs of handles of coffee pots, percolators, or the like, and this without requiring the removal of the handle and without detracting from the appearance of the article.

In the drawing wherein like reference characters indicate corresponding parts in both of the views:

Figure 1 is a side elevation of a conventional coffee pot or percolator, the handle of which is equipped with my improved guard, said guard and the lower end of the handle being partly disclosed in cross section to more clearly indicate the manner of attachment of the guard to the handle, and Figure 2 is a top perspective of the guard per se.

Now having particular reference to the drawing, A designates generally a conventional coffee pot, percolator or the like, equipped at its side with the usual vertical handle B attached to the body of the pot or percolator by the usual short horizontal arms C—C inwardly of the opposite ends thereof. My invention per se consists of a cup 5 of a shape generally similar to the shape of the lower end of the handle B, and for engagement over the lower end of the handle beneath the lowermost arm C. The center of the bottom wall of this cup is provided with an opening through which a screw or other similar fastening 6 may be arranged for tight engagement with the lower end of the handle, see Figure 1. Formed radially upon the side of the cup 5 adjacent the upper edge thereof is a tongue 7 of gradually increasing width toward its outer end, this tongue being adapted for engagement beneath the lowermost arm C of the handle B. The side wall of the cup 5 at the upper edge thereof merges into the opposite edges of this tongue to provide upstanding flanges 8—8 for engagement at opposite sides of the lower arm of the handle B to prevent turning movement of the cup upon the handle. It will thus be seen that by reason of a guard of this character the same may be easily rigidly attached to the lower end of a coffee pot or percolator handle for protecting the entire lower end of the handle from the heat of the burner or stove flame.

Having thus described the invention, what I claim as new is:—

In a utensil embodying a vertically disposed handle that is secured to the utensil by upper and lower horizontal arms, arranged inwardly of the ends of the handle, a protector comprising a cup-shaped member disposed over the lower end of the handle and formed with an opening in the bottom thereof to receive a fastening element that extends into the lower end of the handle, a tongue extending radially from the side of the cup shaped member from a point beneath the upper edge thereof, said tongue gradually increasing in width toward its outer end, the tongue being adapted to extend beneath the lower handle attaching arm, and upstanding flanges upon the opposite side edges of the tongue, the inner ends of said flanges merging with the side wall of the cup member, the upper portion of the side wall directly above the inner end of the tongue being open, the upper faces of the flanges lying flush with the upper edge of the cup shaped member, said flanges engaging the sides of the lower supporting arm to prevent turning of the protector.

In testimony whereof I affix my signature.

CARMEN DIANTONEO.